Jan. 27, 1959  J. E. KREPPS, JR  2,871,358
ULTRA-HIGH-FREQUENCY TUNER FOR TELEVISION RECEIVERS
Filed Aug. 6, 1952  6 Sheets-Sheet 1

INVENTOR.
JAMES EDGAR KREPPS, JR.
BY
ATTORNEYS

Jan. 27, 1959

J. E. KREPPS, JR 2,871,358

ULTRA-HIGH-FREQUENCY TUNER FOR TELEVISION RECEIVERS

Filed Aug. 6 1952

INVENTOR.
JAMES EDGAR KREPPS, JR.

BY

ATTORNEYS

Jan. 27, 1959 J. E. KREPPS, JR 2,871,358
ULTRA-HIGH-FREQUENCY TUNER FOR TELEVISION RECEIVERS
Filed Aug. 6, 1952 6 Sheets-Sheet 3

INVENTOR.
JAMES EDGAR KREPPS, JR.
BY
ATTORNEYS

INVENTOR.
JAMES EDGAR KREPPS, JR
BY
ATTORNEYS

Jan. 27, 1959　　　　J. E. KREPPS, JR　　　2,871,358
ULTRA-HIGH-FREQUENCY TUNER FOR TELEVISION RECEIVERS
Filed Aug. 6, 1952　　　　　　　　　　　　　　6 Sheets-Sheet 6

INVENTOR.
JAMES EDGAR KREPPS, JR.
BY
ATTORNEYS

United States Patent Office 2,871,358
Patented Jan. 27, 1959

2,871,358

ULTRA-HIGH-FREQUENCY TUNER FOR TELEVISION RECEIVERS

James Edgar Krepps, Jr., Bloomington, Ind., assignor, by mesne assignments, to Sarkes Tarzian, Inc. Bloomington, Ind., a corporation of Indiana Application August 6, 1952, Serial No. 302,862

3 Claims. (Cl. 250—40)

The present invention relates to television receivers, and, more particularly, to a television receiver tuner which is adapted continuously to tune the receiver to any one of the television stations in the ultra-high-frequency television band extending from 470 megacycles to 890 megacycles.

In order to increase the number of television transmitting channels available in congested areas of the country, the Federal Communications Commission has allocated the frequency band of 470 to 890 megacycles to commercial television. This television band has been called the U. H. F. band and it is expected that within the near future many television stations will be operating on different channels in this U. H. F. band throughout the country. Accordingly, there is presently a great demand for a television tuner which is relatively inexpensive, compact, of rugged construction, and which is adapted to operate with existing television receivers so that these receivers may be adapted to receive programs from the new U. H. F. television stations.

In my copending application, Serial No. 262,619, filed December 20, 1951, and assigned to the same assignee as the present invention, there is disclosed and claimed a universal tuning system whereby the television receiver may be tuned to stations in the new U. H. F. band as well as to stations in the V. H. F. bands of 54 to 88 megacycles and 174 to 216 megacycles. It is the purpose of the present invention to provide a new and improved U. H. F. tuner which may, if desired, be incorporated in the universal tuning system disclosed in my copending application identified above, and which is extremely simple in construction and operation, is adapted for manufacture according to mass production methods and which is reliable in its operation.

Briefly, in accordance with one aspect of the invention, there is provided an antenna tuning unit, a mixer tuning unit, and a local oscillator tuning unit, each of these units being positioned within a shielded compartment and each unit being tuned by means of a common tuning shaft which extends transversely through the shielded compartment and is supported at either end by the end plates of the tuner. Each of the antenna and mixer tuning units comprises an inductance member supported on an end wall of the compartment and having a U-shaped portion which is spaced therefrom. A set of stator plates is carried by each of the end portions of the inductance member and two sets of rotor plates are carried by the shaft and individually cooperate with the stator sets to provide a split stator condenser connected to the ends of the inductance member and forming therewith a tuned circuit, the resonant frequency of which may be varied by rotation of said tuning shaft. Coupling between the antenna tuning unit and the mixer tuning unit is provided by means of a direct wire connection between the adjacent arms of the inductance members of the respective tuning units through an opening in the shield partition which separates the units and means are provided for preventing currents in the different tuning compartments from flowing through the main chassis of the tuner.

The oscillator tuning unit includes a triode oscillator tube which is supported on the upper deck of the tuner chassis, the plate and grid electrodes of which are connected to a three-quarter wave transmission line in the form of a pair of flat relatively wide conductive strips, the other ends of which in turn support two sets of stator plates. The tuning shaft carries two sets of rotor plates which cooperate with the oscillator stator plate sets so as to vary the capacitive loading of the transmission line section and thereby vary the tuning of the oscillator tuning unit. Coupling between the local oscillator tuning unit and the mixer tuning unit is provided by a direct wire connection between the adjacent ends of the rotors in the mixer and oscillator tuning units, this connection being carried by and rotating with the tuning shaft.

The invention, both as to its organization and method of operation, together with further objects and advantages thereof, will best be understood by reference to the following specification taken in connection with the accompanying drawings in which.

Referring now to the drawings, and more particularly to Figs. 1 to 9, inclusive, 11, 13 and 14 thereof, one embodiment of the ultra-high-frequency tuner of the present invention is shown therein as comprising a generally U-shaped chassis member indicated generally at 25, which is adapted to interfit with a generally U-shaped shield cover, indicated generally at 26, to provide a completely shielded tuner assembly. The chassis member 25 is provided with a top or deck portion 27, on which are supported certain components of the tuner including a local oscillator tube 28 provided with a shield can 29, and the chassis 25 is provided with opposed end portions 30 and 31 which support the ends of a tuning shaft 32 of insulating material which extends transversely between the end portions 30 and 31. A plurality of partitions 33 and 34 are positioned parallel to the end portions 30, 31 and spaced intermediately thereof to define a plurality of tuning compartments 35, 36 and 37. The compartments 35, 36 and 37 respectively contain an antenna tuning unit, a mixer tuning unit, and a local oscillator tuning unit, as will be described in more detail hereinafter.

In order to provide a rigid chassis structure, a pair of tie bars 38 and 39, one on each side of the chassis 25, are connected by any suitable means such as staking or the like, to the edge portions of the partitions 33 and 34 and the end portions 30 and 31. Thus, considering the tie bar 39, this tie bar is provided with the notches 40 and 41 (Fig. 5) which interfit with a corresponding notch in the end portion 30, the end portion being staked as indicated at 42 and 43 to secure the tie bar to the end portion 30. With this construction an extremely rigid chassis is provided while permitting ready access to all of the components of the tuner to permit servicing thereof.

The deck portion 27 of the chassis is provided with the flanges 44 and 45 extending downwardly on either side thereof which are adapted to receive the end portions of the U-shaped shield cover 26. The end flanges 46 and 47 (Fig. 3) of the cover 26 are provided with notches 48 and 49 therein adapted to receive the ends of the tie bars 38 and 39, the notches 48 and 49 being of sufficient length to permit the cover 26 to be inserted over the ends of the tie bars 38 and 39 and slid upwardly under the flanges 44 and 45 to provide a tightly fitting shield around the tuning compartments 35, 36 and 37. The cover 26 is held in place by means of the fasteners 50 and 51 which fit into apertures in the tie bars 38 and 39.

Referring now more particularly to the manner in which the tuning shaft 32 is mounted in the above-described chassis structure, one end of the shaft 32 is provided with an indentation adapted to receive a single ball bearing 52 (Fig. 7) which is positioned between the end of the shaft 32 and an adjusting screw 53 which extends through a bearing plate 53a which is secured to the chassis by means of the screws 53b and threads into a nut 54a which is secured by soldering or the like to the inner face of the bearing plate 53a. A lock nut 54 is provided to lock the screw 53 in position once the proper adjustment has been made.

Figure 14:
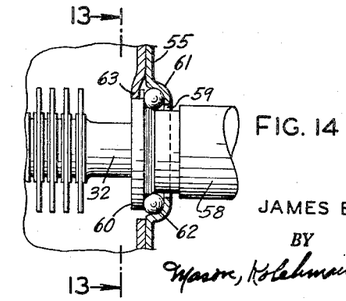
Fig. 14 is a sectional view taken along the lines 14—14 of Fig. 13.

In order to mount the other end of the tuning shaft 32 on the end portion 31 of the chassis, there is provided a bearing plate 55 which is secured to the end portion 31 by means of the screws 56 and is positioned correctly thereon by means of the centering lugs 57 (Fig. 3) integral with the end portion 31. The end of the shaft 32 is connected to a tuning shaft drive member 58 which extends through the aperture 59 in the bearing plate 55 and is provided with the flanged portion 60 (Fig. 14). The bearing plate 55 is provided with an annular flange 61 adjacent the opening 59 which forms with the flange 60 of the member 58 a bearing race adapted to receive a plurality of ball bearings 62.

It will be noted that with the above described bearing arrangement the shaft 32 may be driven from either end since the bearing plates 53a and 55 are similar and may be interchanged for situations where the tuning shaft 32 must be driven from the rear. Accordingly, the adaptability of the tuner to various television chassis constructions is greatly increased.

In order to limit the rotation of the shaft 32 to approximately 180° there is provided a stop lug 63 which is struck out of the end portion 31 adjacent the tuning shaft aperture therein and the flange 60 is provided with an arcuate section of reduced diameter defining the shoulders 64 and 65 which cooperate with the lug 63 to limit the rotation of the shaft 32 to 180°.

Figure 1:
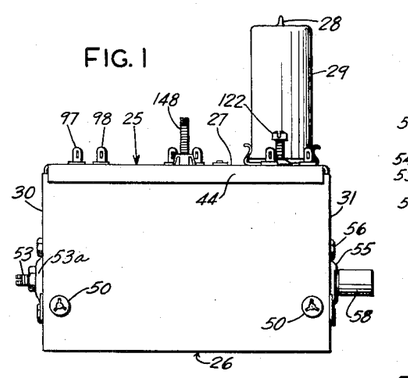
Fig. 1 is a front elevational view of a U. H. F. television tuner construction embodying the present invention.
Figure 2:
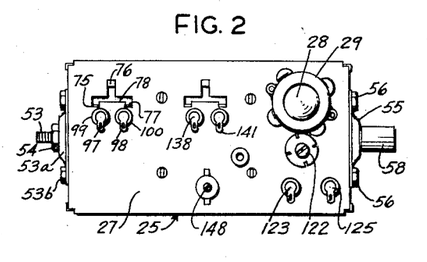
Fig. 2 is a plan view of the tuner of Fig. 1.
Figure 3:
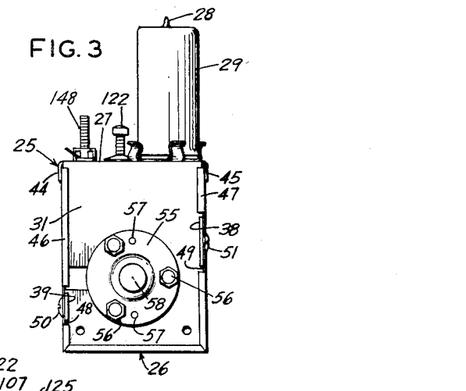
Fig. 3 is a right side view of the tuner of Fig. 1.
Figure 4:
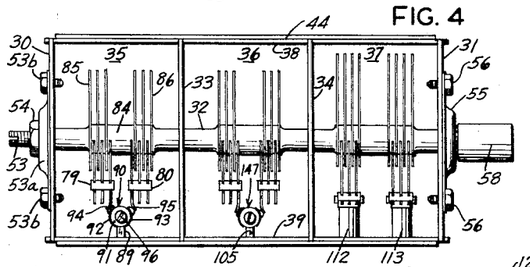
Fig. 4 is a bottom view on a somewhat larger scale of the tuner of Fig. 1 with the shield cover removed.
Figure 9:
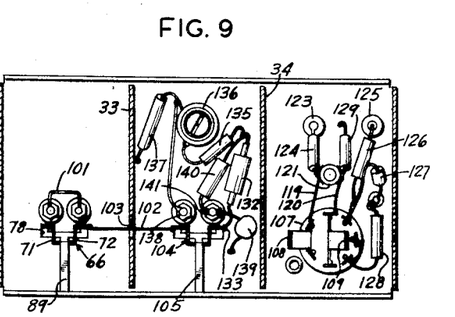
Fig. 9 is a bottom view partly in section taken along the lines 9—9 of Fig. 5.

Considering now in more detail the tuning units which are positioned within the tuning compartments 35, 36, and 37, the compartment 35 houses an antenna tuning unit which is adapted to be tuned throughout the ultra-high-frequency television band of 470 to 890 megacycles by rotation of the tuning shaft 32 through approximately 180°. More particularly, the antenna tuning unit in the compartment 35 comprises an inductance member indicated generally at 66 which is supported by and depends from the under side of the deck portion 27 of the chassis 25. The inductance member 66 includes the bifurcate end portions 67 and 68 and the bight portion 69 which together define a U-shaped inductance portion, the member 66 being provided with an integral extension 70 which spaces the bight portion 69 and end portions 67 and 68 away from the deck portion 27 of the chassis 25. The member 66 is provided with the portions 71 and 72 which stiffen the member 66 and cooperate with the outwardly turned end portions 73 and 74 to provide an extremely rigid box-like supporting structure. The member 66 is secured to the underside of the deck portion 27 by means of a plurality of lug portions 75, 76, and 77, which are adapted to be inserted into the ends of an irregularly shaped slot 78 formed in the deck portion 27. As is best illustrated in Figs. 2 and 9, the portions 71 and 72 of the member 66 are preferably positioned transversely of the slot 78 intermediate the ends thereof so that when the lug portions 75, 76 and 77 are bent outwardly after insertion through the slot 78, the member 66 is rigidly secured to the deck portion 27.

Figure 5:
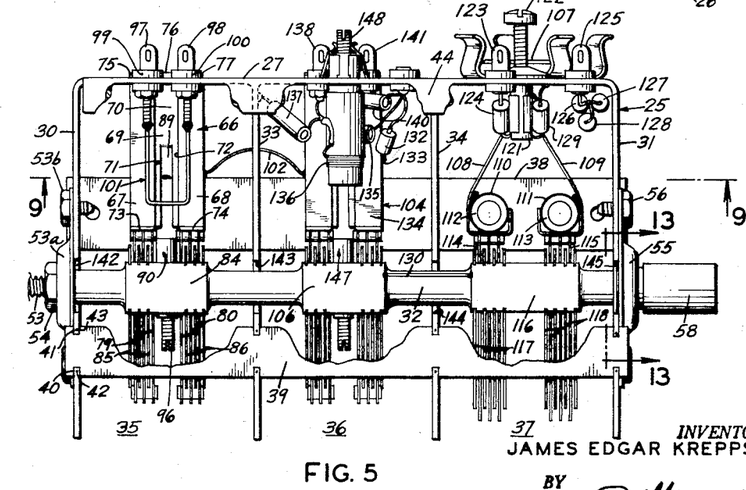
Fig. 5 is a front elevational view on a somewhat larger scale of the tuner of Fig. 1 and with the shield cover removed.
Figure 6:
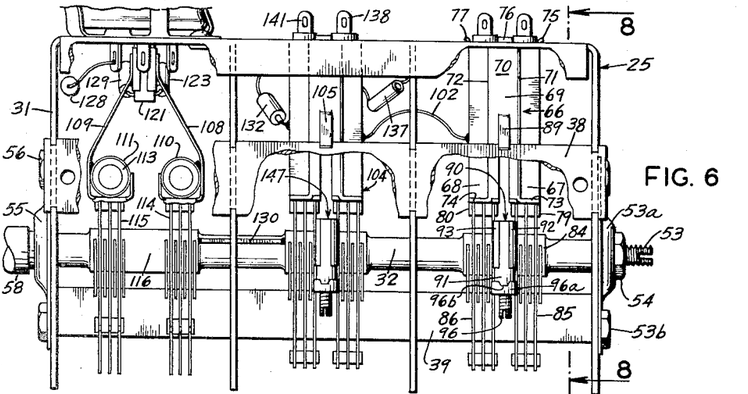
Fig. 6 is a rear elevational view on a somewhat larger scale of the tuner of Fig. 1 and with the shield cover removed.
Figure 7:
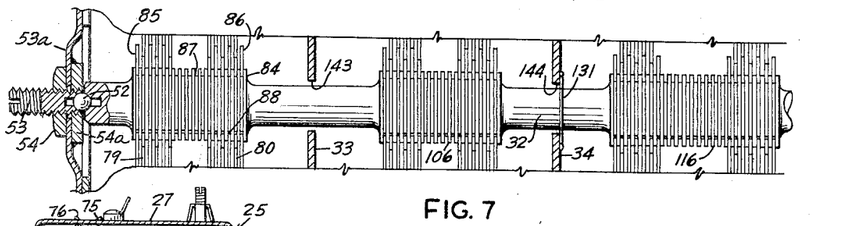
Fig. 7 is a plan view of the rotor and tuning shaft subassembly of the tuner of Fig. 1.
Figure 8:
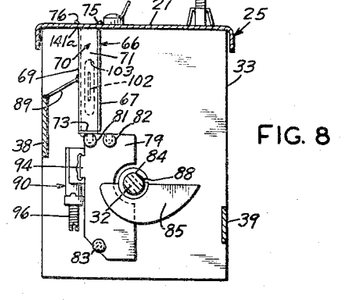
Fig. 8 is an end elevational view partly in section taken along the lines 8—8 of Fig. 6.

The end portions 73 and 74 of the inductance member 66 each support a set of stator condenser plates. Thus, the end portion 73 supports the set of stator plates 79, as best illustrated in Figs. 5 and 8, and the end portion 74 supports the set of stator plates 80. The plates in each set, such as the set 79, are secured together in spaced relation by means of the tie rods 81, 82 and 83 which are slotted to receive corresponding notched portions in the stator plates as best shown in Fig. 8.

Positioned on the tuning shaft 32 adjacent the stator plates 79, 80, there is provided a conductive rotor hub, or sleeve 84, which carries two sets of condenser rotor plates 85 and 86, spaced along the length thereof so as to cooperate with the stator plates 79 and 80 to provide a split stator variable condenser arrangement. In order to secure the rotor plates 85 and 86 on the conductive rotor hub 84, the hub is provided with a plurality of transverse slots 87 (Fig. 7) adapted to receive semi-circularly notched portions in the rotor plates 85 and 86, these plates being secured to the rotor 84 by a suitable staking operation, or the like. In the alternative, the rotor plates 85 and 86 may be secured within the notches 87 by soldering the plates 85 and 86 to the hub 84.

In order to secure the rotor hub 84 to the tuning shaft 32 without the use of set screws or the like which would tend to chip or crack the tuning shaft 32 which is preferably of insulating material such as Mycalex or other insulating material and is brittle and easily chipped or cracked, the rotor hub 84 is provided with a longitudinal slot 88 therethrough so that the hub 84 may be expanded slightly and the inside diameter of the hub 84 is made slightly less than the outside diameter of the tuning shaft 32. The hub 84, with the rotor plates 85 and 86 mounted thereon, is then press fitted onto the tuning shaft 32 and is secured in place at the desired point along the shaft 32 by a suitable cementing operation or the like. In order to provide for maximum expansion of the hub 84, the slot 88 therein is preferably positioned adjacent one edge of the rotor plates 85 and 86 as clearly shown in Fig. 8.

In order to reduce the ultra-high-frequency currents which would normally tend to flow through the deck portion 27 of the chassis the member 66 is provided with a ground strap portion 89 which extends from the bight portion 69 of the inductance member 66 to the adjacent edge of the tie bar 38. With this arrangement most of the ultra-high-frequency currents do not pass through the extension portion 70 of the inductance member 66 or the deck portion 27 of the chassis so that coupling between the tuning compartments 35, 36 and 37 through the main chassis is prevented, as will be described in more detail hereinafter.

Figure 11:
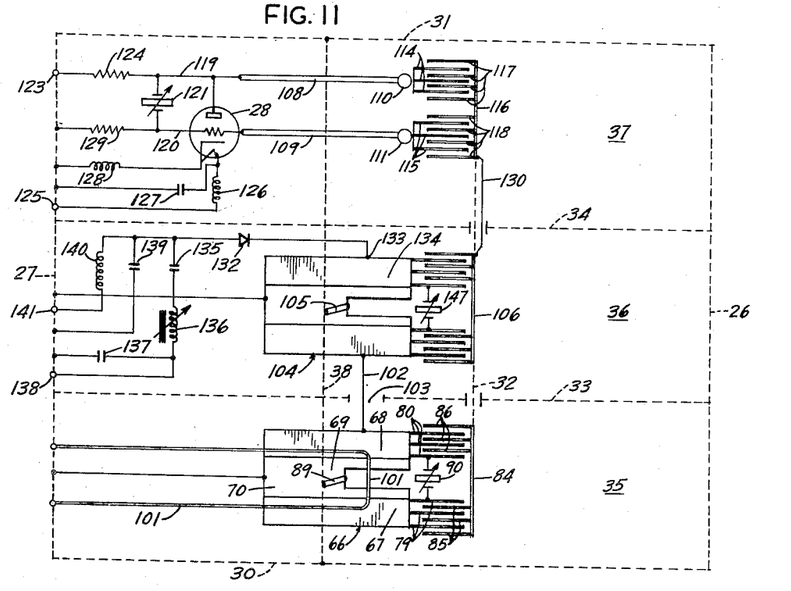
Fig. 11 is a schematic diagram of the tuner of Fig. 1.

Considering now the electrical characteristics of the above-described antenna tuning unit, reference may be had to Fig. 11 wherein this unit is shown in schematic form. As there shown, the end portions 67 and 68 and the bight portion 69 of the inductance member 66 constitute a single half-turn inductor to the ends of which there is connected a split stator condenser comprising the stator plates 79 and 80 and the rotor plates 85, 86. The conductive hub 84 connects the two sets of rotor plates 85 and 86 so that a split stator variable condenser is provided and as the shaft 32 is rotated the rotor plates are introduced between the stator plates in varying amounts to provide a variable capacity associated with the inductance portion of the inductance member 66. In this connection it will be understood that the physical dimensions of the inductance member 66 and the size and number of the condenser plates may be chosen so that the tuning unit may be tuned throughout the ultra-high-frequency television band.

In order to trim the tuning unit, i. e. adjust the tuning thereof independently of the main tuning condenser, there is provided a split stator trimmer condenser 90 which is electrically connected to and physically supported by the innermost ones of the condenser stator plates 79, 80. More specifically, the split-stator trimmer condenser 90 comprises an internally threaded ceramic tube 91 (Fig. 4) having two conductive strips 92 and 93 coated on the outside thereof and extending longitudinally therealong. The strips 92 and 93 are soldered to a pair of tabs 94 and 95 on the innermost ones of the stator plates 79 and 80 so that the tubular form 91 is supported in a vertical position adjacent the innermost ones of the stator plates. A tuning screw 96 is threaded into the top of the tubular member 91 and may be introduced to varying depths between the conductive strips 92 and 93 so as to provide a balanced variable capacity between these elements. The tuning screw may be held in adjusted position by means of a lock nut 96a (Fig. 6), preferably of polystyrene or other insulating material having good insulating qualities, which is provided with a notch 96b which cooperates with a corresponding ridge on the end of the tubular form 91 to prevent the nut 96a from turning. The described trimmer condenser 90 is particularly adapted to trim the tuning unit described in detail above because the trimmer 90 has a very low minimum capacity and a relatively large change in capacity is obtained by means of the adjusting screw 96. For example, it has been found that the trimmer condenser 90 may have a minimum capacity of 0.3 micromicrofarad and a change in capacity of more than 3 to 1. Furthermore, by mounting the trimmer 90 in the manner described above the tuning unit is completely balanced with respect to ground.

In order to introduce the ultra-high-frequency signal, which is received by any suitable antenna means (not shown), into the antenna tuning unit positioned within the compartment 35, there is provided the antenna input terminals 97 and 98 which extend through insulating grommets 99 and 100 positioned in the deck portion 27 of the chassis and the innermost ends of the terminals 97 and 98 support a U-shaped coupling loop 101 which is positioned generally parallel to and spaced from the inductance member 66 adjacent the portions 67 and 68 thereof. The amount of received energy coupled into the antenna tuning unit may readily be varied by varying the position of the loop 101 relative to the rigidly positioned inductance member 66, the loop 101 being preferably of relatively heavy wire to prevent the loop from varying in position once it is adjusted.

From the foregoing description of the electrical characteristics of the antenna tuning unit, it will be seen that the active portion of the inductance member 66 comprises the end portions 67 and 68 thereof and the bight portion 69 which together constitute a half-turn of inductance, and the extension portion 70 of the inductance member 66 forms no useful part of the inductance for the tuning unit but instead is provided to space the half-turn inductance away from the deck portion of the chassis by an amount sufficient to permit a three-quarter wave transmission line section to be employed in the oscillator tuning compartment 37, as will be described in more detail hereinafter. Therefore, instead of contributing to proper operation of the antenna tuning unit, the extension portion 70 of the inductance member 66 detracts therefrom and it has been found in actual practice that if the extension portion 70 is simply grounded to the deck portion of the chassis so that ultra-high frequency currents flow through the extension portion 70 and the deck portion of the chassis, spurious modes of oscillation are set up within the tuning compartment 35 and interaction between tuning units results.

In accordance with an important feature of the present invention, these results are avoided by connecting the ground strap 89 from the bight portion of the inductance member 66 to the adjacent portion of the tie bar 38. In this connection, it will be recalled that the tie bar 38 is positioned a substantial distance below the deck portion 27 of the chassis and is electrically connected to the end portions 30 and 31 thereof and the shield partitions 33 and 34. With this arrangement, the ultra-high-frequency currents flow primarily through the half-turn portion of the inductance member 66 and are prevented from flowing through the extension portion 70 thereof and the adjacent deck portion of the chassis. In effect, therefore, the antenna tuning unit is isolated from the other circuits of the tuner and inter-action between tuning units is avoided.

In order to produce an intermediate frequency signal which may be supplied to the input circuit of a conventional television receiver, the ultra-high-frequency signal selected in the antenna tuning unit is coupled to a mixer tuning unit positioned within the mixer tuning compartment 36. The mixer tuning unit in the compartment 36 is substantially identical to the antenna tuning unit described in detail above and hence a detailed description thereof is considered unnecessary herein. However, certain additional circuit components are included in the mixer tuning compartment 35 to provide a suitable mixing or heterodyning operation.

In the illustrated embodiment the ultra-high-frequency signal developed in the antenna tuning unit is coupled to the mixer tuning unit by means of a direct wire connection between the adjacent legs of the inductance members in the tuning compartments 35 and 36. Thus, the wire 102 is connected from a point on the end portion 68 of the inductance member 66 through an opening 103 in the shield partition 33 (Fig. 8) to a point on the adjacent leg of the inductance member 104 of the mixer tuning unit. Preferably the opening 103 is in the form of an elongated slot extending vertically in the partition 33 so that the points at which the wire 102 is connected to the adjacent legs of the inductance members 66 and 104 may be varied to provide optimum coupling between these inductance members. With this arrangement it will be evident from the foregoing description that the coupling loop between the inductance members 66 and 104 is completely removed from the deck portion of the chassis of the tuner so that inter-action between the tuning units as a result of this coupling is avoided. This will be readily understood when it is realized that the bight portion of the inductance member 104 is also connected to the tie bar 38 by means of the ground strap 105 so that coupling between these tuning units is provided over a path which includes the wire 102, the adjacent leg portions of the inductance members 66 and 104, the ground straps 89 and 105 and the tie bar 38. It will also be evident that coupling between the antenna and mixer tuning units over a path other than the above described direct wire connection 102 is prevented since the rotor hubs 84 and 106 on the tuning shaft 32 are positioned relatively far apart so that substantially no capacitive coupling occurs between these circuit elements through the insulating tuning shaft 32.

Considering now the details of the local oscillator tuning unit positioned within the compartment 37, the triode oscillator tube 28, which is preferably of the commercial type 6AF4, is positioned on the top side of the deck portion 27 of the chassis adjacent the tuning compartment 37 and is seated in the tube socket 107, the terminals of which extend into the tuning compartment 37. The plate and grid terminals of the tube 28 are respectively connected to one end of a pair of relatively wide flat conductive strips 108 and 109 which together comprise a transmission line section having an electrical length of approximately three-quarters of a wave length at the operating frequency of the oscillator tuning unit. The other ends of the transmission line elements 108 and 109 are provided with rectangular shaped end portions respectively connected to and supported by conductive bands 110 and 111 carried on the outer ends of a pair of insulating posts 112 and 113. The posts 112 and 113 are supported at the other end thereof on the tie bar 38 by any suitable means. For example, the posts 112 and 113 may be provided with conductive bands similar to the bands 110, 111 at the other ends thereof which are soldered or otherwise secured in suitable apertures in the tie bar 38. The transmission line elements 108 and 109 are thus secured at one end directly to the anode and control grid terminals of the tube 28 and at the other end thereof to the free ends of the insulating posts 112 and 113.

The insulating posts 112 and 113 each support a set of stator plates 114 and 115 and a rotor hub 116, which is similar to the rotor hub 84 described in detail above, is positioned on the tuning shaft 32 and carries two sets of rotor condenser plates 117 and 118 which respectively cooperate with the stator sets 114 and 115 to provide a split stator variable condenser connected to the ends of the transmission line elements 108 and 109. The anode and control grid terminals of the tube 28 are also connected by means of the flat conductive strips 119 and 120 (Fig. 9) to the stator terminals of a split stator trimmer condenser 121 which is supported on the deck portion 27 of the chassis and is adjustable by means of the screw 122 accessible from the top of the tuner unit. The trimmer condenser 121 is substantially identical to the trimmer condenser 90 described in detail above and is employed to vary the minimum capacity of the local oscillator tuning unit. In the alternative, the trimmer condenser 121 may be connected directly between the ends of the transmission line elements 108 and 109 adjacent the grid and plate terminals of the tube 28.

Energizing potential for the anode of the tube 28 is connected from an external source by way of the terminal 123 positioned on the deck of the chassis and through the resistor 124 and conductive strip 119 to the anode terminals of the tube 28. Filament potential for the tube 28 is supplied by way of the terminal 125 positioned on the deck of the chassis and through the filament choke 126 to one filament terminal of the tube 28. A condenser 127 is connected from this filament terminal to the deck portion of the chassis and the other filament terminal, which is connected to the cathode terminal of the tube 28, is also connected through the filament choke 128 to the deck portion of the chassis. With this arrangement degenerative coupling to the filament and cathode circuits is avoided as will be well understood by those skilled in the art. A grid leak resistor 129 is connected from the control grid of the tube 28 to the deck portion of the chassis.

In considering the operation of the above described oscillator tuning unit, it will be understood that the elements 108 and 109 function as a transmission line section which is capacity loaded by means of the stator plates 114, 115 and the rotor plates 117 and 118, and forms the tank circuit for the oscillator tube 28. The frequency of the oscillations developed in the above described tank circuit by the tube 28 may be varied by rotation of the tuning shaft 32 which varies the capacity loading on the transmission line section 108, 109. Preferably the transmission line sections 108 and 109 have an electrical length of approximately three-quarters of a wave length at a given operating frequency of the oscillator tuning unit so that an effective short circuit is produced by the variable capacity loading at a point one-half wave length removed from the end of the transmission line section and this short circuit may be made to appear directly at the terminals of the tube 28 so that an extremely high frequency oscillatory circuit is provided which may be resonated at the highest frequency in the ultra-high-frequency television band. In this connection it will be understood that the provision of transmission line elements 108 and 109 which are three-quarters of a wave length long requires that the tuning shaft 32 be positioned a substantial distance away from the deck portion 27 of the tuner and since the tuning shaft 32 is common to the antenna and mixer tuning unit of the tuner this means that the inductance elements 66 and 104 thereof must be constructed to conform to this position of the tuning shaft 32. However, by means of the above described grounding arrangement whereby the bight portions of the inductance element members 66 and 104 are connected to the tie bar 38 through the ground straps 89 and 105, spacing of the antenna and mixer tuning units a relatively great distance away from the deck portion 27 does not produce spurious modes of oscillation therein and undesired coupling therebetween.

In order to couple oscillations produced in the oscillator tuning unit to the mixer tuning unit in the compartment 36 without affecting the tuning of the oscillator tuning unit throughout the ultra-high-frequency television band, coupling between the oscillator and mixer tuning units is provided by means of a direct conductive connection between the rotors 116 and 106 of these tuning units. More specifically, one end of the rotor hub 116 is connected by means of a flat conductive strip 130 to the adjacent end of the rotor hub 106 of the mixer tuning unit. The conductive strip 130 is fastened to the rotor hub 116 by any suitable means such as soldering or the like and lies flat on the shaft 32 while passing through the aperture in the partition 34 for the tuning shaft 32. At its other end the strip 130 is soldered to the adjacent end of the rotor hub 106. With this arrangement an oscillator signal voltage is injected into the mixer tuning circuit without inter-action with the other signals introduced into this tuning unit and without corresponding reflection back on the oscillator tank circuit. While it would appear that coupling between the rotor hubs 116 and 106 in the manner described above would be ineffective to transmit any appreciable signal voltage between the oscillator and tuning unit, since an effective short circuit is placed on the transmission line elements 108 and 109 approximately one-half wave length away from the ends thereof, it has been found in actual practice that a substantial voltage exists at either end of the rotor hub 116. This voltage, when coupled to the rotor 106 is of sufficient amplitude to produce correct heterodyning action in the mixer tuning unit.

Considering now the manner in which the above-described oscillator voltage is heterodyned with the ultra-high-frequency signal in the mixer tuning unit to produce an intermediate frequency output signal, it will be understood from the foregoing description that the oscillator signal is introduced into the capacitive branch of the mixer tuning circuit by way of the strip 130 and the ultra-high-frequency signal is introduced into one leg of the inductive branch of the mixer tuned circuit. The other leg of the inductance member 104 is employed as an output circuit to derive the heterodyne intermediate frequency output signal. More specifically, a crystal rectifier 132 is positioned within the tuning compartment 36 and has one electrode thereof connected to the point 133 (Figs. 5 and 11) on the inductance leg 134 of the inductance member 104 in the mixer tuning unit. The other electrode of the rectifier 132 is connected through the series combination of a condenser 135, a powdered iron core variable inductance 136 and a condenser 137 to the deck portion 27 of the tuner chassis. The junction point of the condenser 137 and the inductance 136 is connected to an intermediate frequency output terminal 138 positioned on the deck portion 27. A condenser 139 is also connected from the other electrode of the rectifier 132 to the deck portion 27 and a choke coil 140 is connected from this other electrode to a terminal 141 positioned on the deck portion 27. With this arrangement the coil 140 may be employed to read crystal rectifier current by connecting a meter between the terminal 141 and the deck portion of the chassis. The values of the condensers 139 and 135 are chosen so as to match a particular intermediate frequency input circuit as will be well understood by those skilled in the art, and the inductance 136 may be varied to select a particular intermediate frequency. The condenser 137 provides coupling between the output circuit of the crystal rectifier 132 and the intermediate frequency input circuit of the television receiver.

While a crystal mixer is shown in the illustrated embodiment it will be understood that a vacuum tube mixer may equally well be employed to obtain a suitable intermediate frequency signal. For example a grounded grid triode mixer stage may be employed instead of the crystal 132 and the point 133 connected to the cathode of this stage as will be well understood by those skilled in the art. Preferably, the mixer tube is mounted in a tube socket which is positioned in line with the tube socket 107 on a diagonal across the top of the tuner chassis so that the chassis may be turned end for end without changing the tube lineup.

Considering now the manner in which the above-described ultra-high-frequency tuner may be assembled by relatively unskilled personnel and by means adapted to mass production techniques, the partitions 33 and 34 and the tie bars 38 and 39 are first staked into place, the insulating posts 112 and 113 being first supported on the tie bar 38 before this tie bar is staked in place. The socket 107 and the other hardware such as the terminals 97, 98, etc., are then assembled on the chassis deck portion 27 after which the inductance members 66 and 104 are secured in place on the deck portion 27 in the manner described in detail heretofore. The bottom edge of each inductance element is preferably secured to the deck portion 27 by soldering, as illustrated at 141a in Fig. 8, so that good electrical contact between the inductance member and the deck portion 27 is obtained. The electrical components of the tuner, such as the resistors 124 and 129, the condensers 121, 127, 135, 137, 139, etc., and the inductances 108, 109, 126, 128 and 136 are then wired in place to the appropriate terminal connections on the socket 107 and the other terminals positioned on the chassis. After the electrical components of the tuner have been wired in, the rotor shaft drive member 58 is assembled on one end of the micalex tuning shaft 32 at a separate sub-assembly position and the front bearing plate 55 and ball bearings 62 are assembled thereon and held temporarily in place. The rotor hubs 84, 106 and 116 are then press fitted onto the shaft 32 and are positioned correctly along the length of the shaft 32 by means of jigs which insure the correct spacing of the rotor hubs. However, it will be understood that this spacing is not critical since the stator plates are positioned to conform to the rotor plate spacing after the rotor has been assembled in the tuner itself, as will be discussed in more detail hereinafter. The rotor hubs, once they are positioned correctly on the shaft 32 by means of the above-described jigs are then cemented in place to prevent these rotor hubs from slipping or turning on the shaft 32.

In order to permit the insertion of the rotor assembly as a unit into the tuner chassis, the partitions 33 and 34 and the end portions 30 and 31 of the chassis are provided with aligned slots extending inwardly from one edge thereof and communicating with the centrally located tuning shaft aperture in each of these members. Thus, the slot 142 in the end portion 30, the slot 143 in the partition 33, the slot 144 in the partition 34 and the slot 145 (Fig. 13) in the end portion 31 are aligned so that the rotor assembly may be dropped in place through the slots 142, 143, 144, and 145 and the single ball bearing 52 positioned in the end of the adjusting screw 53. In this connection it will be understood that the end portion 31 is provided with the aperture 146 (Fig. 13) communicating with the slot 145 therein, which is of sufficient diameter to permit the hub portion 60 of the member 58 to be inserted therethrough so that the tuning shaft assembly may first be inserted through the above-described aligned slots and then moved rearwardly so as to seat the rear end of the tuning shaft on the ball bearing 52. The bearing plate 55 is then positioned on the centering lugs 57, the plate 55 secured to the end portion 31 by means of the screws 57, and the adjusting screw 53 is tightened to take up end play of the rotor shaft 32. If desired a conductive strap 131 (Fig. 7) may be removably connected as by soldering or the like across the slot 144 after the rotor assembly is in place, to reduce electromagnetic coupling between the mixer and the local oscillator tuning units through the slot 144.

After the rotor assembly has been assembled to the chassis in the manner described above, the individual sets of stator plates are positioned correctly with respect to the cooperating sets of rotor plates by means of suitable jigs and each stator set is then soldered to its corresponding support member to provide a strain-free stator mounting in which the stator and rotor plates are correctly aligned for uniform capacity variation. Thus, for example, in the antenna tuning unit, the stator set 79, the individual plates of which have been previously connected together as a unit by means of the tie bars 81, 82 and 83, is positioned as a unit in interleaved relation with the rotor plates 85 by means of suitable jigs after which the upper end of the stator set 85 is puddle soldered to the supporting end section 73 of the inductance member 66. In a similar manner the stator set 80 is positioned as a unit on the end section 74 and after being correctly aligned with respect to the rotor plates 86 by means of appropriate jigs is puddle soldered in place so as to provide a strain-free mounting of the stator plates on the bottom end of the inductance member 66. In a similar manner the stator sets of the mixer and oscillator tuning unit are respectively assembled to the inductance member 104 and the end portions of the transmission line elements 108 and 109 carried by the ends of the insulating posts 112 and 113.

After the rotor and stator plates of the tuner have been completely assembled in the manner described above the shield cover 26 is positioned around the chassis so as to completely enclose the tuning units. The antenna tuning unit and mixer tuning unit may be trimmed by variation of the trimming condensers 90 and 147 which are accessible through suitable apertures (not shown) in the bottom of the cover 26. The oscillator tuning unit may also be trimmed by variation of the trimmer condenser 121 thereof which is accessible from the top of the chassis by variation of the adjusting screw 122 thereof. In a similar manner the intermediate frequency coil 136 may be tuned by variation of the tuning shaft 148 thereof which is also accessible from the top of the tuner chassis.

Figure 10:
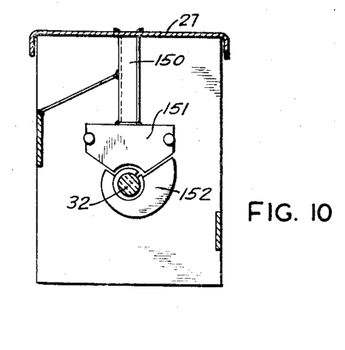
Fig. 10 is a view similar to that of Fig. 8 showing an alternative arrangement of the tuning plates of the tuner.

In the event that a greater angle of rotation of the tuning shaft 32 is desired, the alternative arrangement of the stator and rotor condenser plates may be employed as shown in Fig. 10 of the drawings. In this embodiment the shape of the stator and rotor plates is modified so as to permit 270° rotation therebetween for a variation from minimum to maximum capacity of the condenser. Thus, each of the antenna and mixer tuning units would be substantially as shown in Fig. 10 wherein the inductance member 150 is supported from the deck portion 27 of the chassis in substantially the middle of the tuner and the stator plates 151 which are of generally triangular shape, are supported at the middle thereof from the bottom end portions of the inductance member 150. The rotor plates 152 have a configuration such that 270° rotation thereof is required to produce maximum capacity with the stator plates 151. In other respects the antenna and mixer tuning units are substantially as described heretofore in connection with the embodiment shown in Figs. 1 to 9, inclusive. In the oscillator tuning unit of this alternative embodiment the rotor and stator plates are supported from the insulating posts 112 and 113 and have substantially the shape shown in Fig. 10 of the drawings. With this arrangement, a greater separation between the stations in the ultra-high-frequency band is permitted and the ease with which a particular station in the ultra-high-frequency band may be selected is increased.

A further alternative embodiment of the present invention is shown in Figs. 12 and 15 to 21, inclusive of the drawings. In this embodiment, the chassis of the tuner comprises a pair of semi-cylindrical castings or housings, 175 and 176 (Fig. 15) which are provided internally thereof with a plurality of spaced, axially aligned semi-cylindrical openings therein to define a plurality of spaced axially aligned cylindrical cavities 177, 178 and 179 therein when the housing members 175 and 176 are positioned in opposed face-to-face relation. In order to reduce the amount of material required in the castings 175 and 176, slots 180 are provided intermediate the cavities 177, 178 and 179 so that relatively thin wall portions separate the cavities 177, 178 and 179. The housings 175 and 176 are provided with cooperating flanges 181 and 182 around the meeting edges thereof which may be secured together to provide complete shielding of the cylindrical cavities 177, 178 and 179. The housing 175 is provided with a top opening 183 through which an oscillator tube 184 may be inserted into a socket positioned internally of the cavity 179 and a shield can 185 may be positioned around the tube 184 to shield the same. A tuning shaft 186 of insulating material extends transversely through the center of the cavities 177, 178 and 179 and is supported at the rear end thereof by means of the adjusting screw 187. In the ultra-high-frequency tuner of Fig. 15 the cavity 177 is employed as an antenna tuning cavity, the cavity 178 is employed as a mixer tuning cavity and the cavity 179 is employed as a local oscillator tuning cavity.

Figures 15, 16, 17:
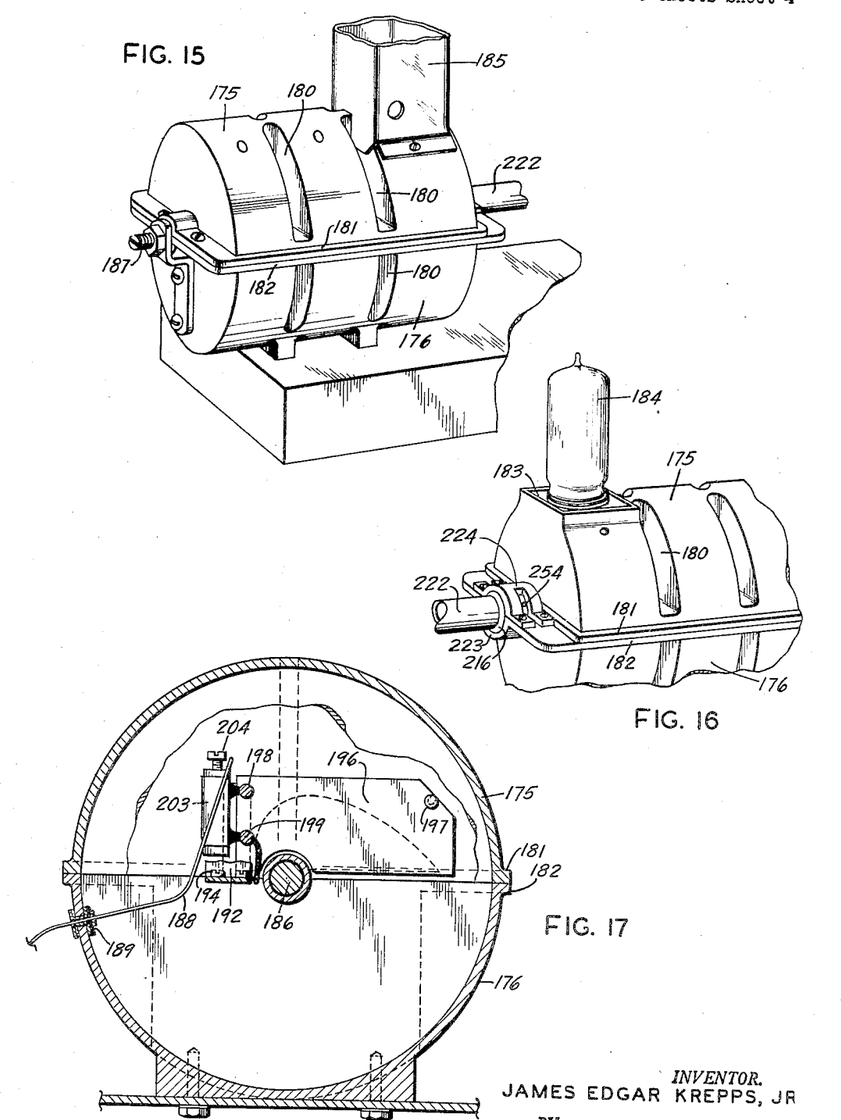
Fig. 15 is a perspective view of an alternative embodiment of the present invention.
Fig. 16 is a fragmentary perspective view of the tuner of Fig. 15 taken from the other side.
Fig. 17 is an end view, partly in section, of one of the tuning cavities of the tuner of Fig. 15.
Figure 18:
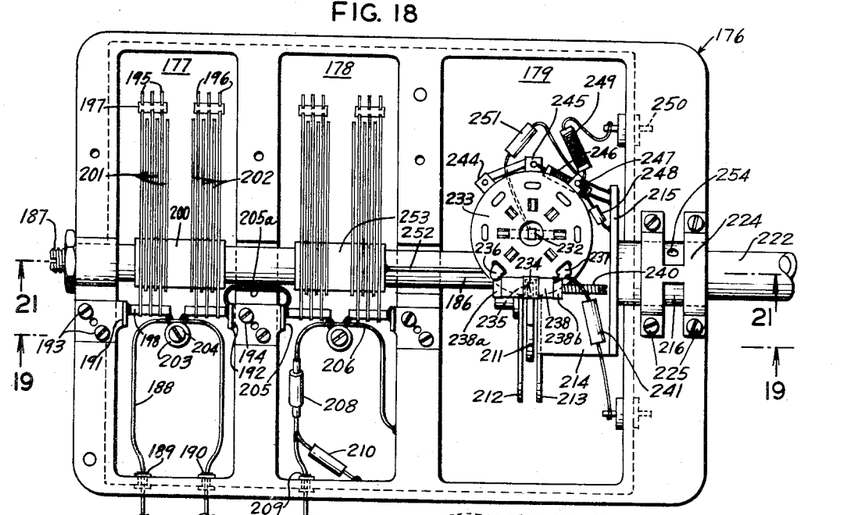
Fig. 18 is a plan view of the bottom portion of the tuner of Fig. 15 with the top portion thereof removed.
Figure 19:
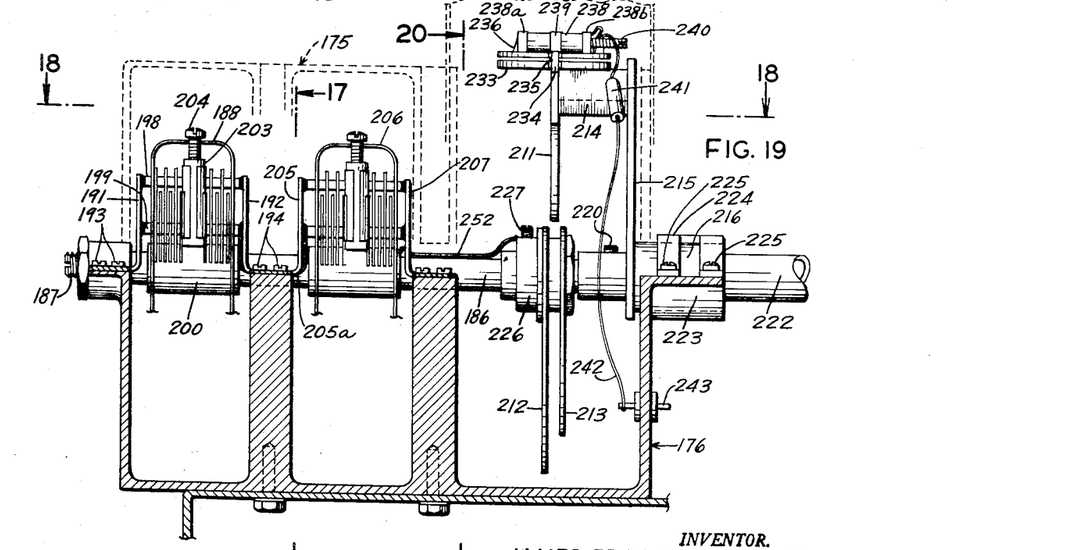
Fig. 19 is a side elevational view, partly in section, taken along the lines 19—19 of Fig. 18.

Referring now more particularly to the details of the antenna tuning cavity of the tuner of Fig. 15, the ultra-high-frequency signal is coupled to this cavity by means of the loop 188 which enters the cavity through the grommets 189 and 190 positioned in the side wall of the casing section 176. Positioned on either side of the cavity 177 adjacent the center aperture therein there is provided a pair of conductive supporting posts 191 and 192 which are provided with right angle sections which are supported on the upper surface of the casting 176 by means of the screws 193 and 194. The supporting posts 191 and 192 are positioned somewhat inside of the end walls of the cavity 177 and each support a separate set of stator plates 195 and 196. Thus, the stator set 195 is secured together by means of the tie bars 197, 198 and 199 and these tie bars are in turn supported by suitable solder connection or the like to spaced points on the supporting post 191. The tuning shaft 186 carries a conductive rotor hub 200 which in turn supports two sets of rotor plates 201 and 202 which cooperate with the stator plates 195 and 196 to provide a split stator variable condenser which is connected across the upper portion of the supporting posts 191 and 192. Since the supporting posts 191 and 192 are connected at the base thereof to the side walls of the cavity 177, the inductance portion of the antenna tuning unit in the cavity 177 comprises the supporting posts 191 and 192 and the side and end walls of the cavity 177 proper. With this arrangement the natural modes of oscillation of the cavity 177 cannot interfere with the proper operation of the antenna tuning unit when this unit is tuned to frequencies in the ultra-high-frequency television band. Since the natural resonant frequency of the cavity 177 decreases as the physical dimensions of the cavity are increased it will be evident that there is a maximum size which the cavity 177 can have and still not interfere with the correct operation of the antenna tuning unit throughout the ultra-high-frequency television band. The antenna tuning unit may be trimmed by means of a variable split stator condenser 203 which is supported upon the innermost ends of the stator plate tie bars such as the bars 198 and 199 and the adjusting screw 204 may be used to vary the capacitance of the trimmer 203 for alignment purposes.

The mixer tuning unit positioned within the cavity 178 is substantially identical to the antenna tuning unit positioned within the cavity 177 and energy is coupled between these units by means of a direct wire connection 205a from the supporting post 192 to the supporting post 205. An intermediate frequency output signal is coupled from the mixer tuning unit by means of a coupling loop 206 the sides of which are generally parallel to the supporting posts 205 and 207 in the mixer tuning unit and a crystal rectifier 208 is connected from one end of the loop 206 through an insulating grommet 209 to the tuned input circuit of the receiver, the other end of the loop 206 being connected to the wall of the cavity 178. A condenser 210 is connected from the other electrode of the rectifier 208 to casing 176 to by-pass ultra-high-frequency currents.

Figure 21:
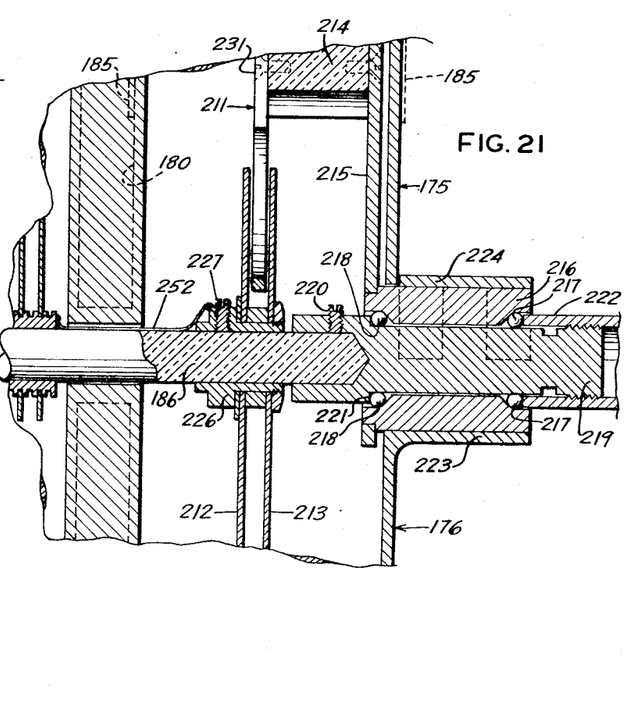
Fig. 21 is a fragmentary cross sectional view on a somewhat larger scale taken along the lines 21—21 of Fig. 18.

In the oscillator section of the tuner of Fig. 15 a different type of tank circuit is employed comprising a substantially complete single turn inductance 211, the inductance of which is varied by means of the short circuiting vanes 212 and 213 which may be rotated so as to cover variable portions of the inductance turn 211. The single turn inductance 211 is supported from a block of insulating material 214 which is in turn supported on an upstanding plate 215 carried by the tuning shaft 186. Thus, as is best illustrated in Fig. 21, the supporting plate 215 is carriedy by an intermediate bearing sleeve 216 which is supported at either end thereof by means of the ball bearings 217 and 218 on an inner conductive shaft member 219 to which is secured by means of the set screw 220 the end of the insulating tuning shaft 186. The ball bearings 218 are positioned between the shoulder 221 on the shaft member 219 and an inclined shoulder on the bearing sleeve 216 and the ball bearings 217 are positioned between the end of a hollow tuning shaft 222 and an inclined shoulder on the bearing sleeve 216. The end portion of the bearing member 219 is threaded externally and threads into the hollow tuning shaft 222 so that as these members are brought closer together the ball bearings 217 and 218 are engaged with the sloping shoulders on bearing sleeve 216. The bearing sleeve 216 is supported on a semi-cylindrical bearing seat 223 formed in the casting 176 and the sleeve 216 is retained within the bearing seat 223 by means of a sheet metal strap 224 which is positioned around the upper half of the bearing sleeve 216 and is secured to the casting 176 by means of the screws 225. The short circuiting vanes 212 and 213 are carried by a hub member 226 which is secured to the tuning shaft 186 by means of a set screw 227.

Figure 20:
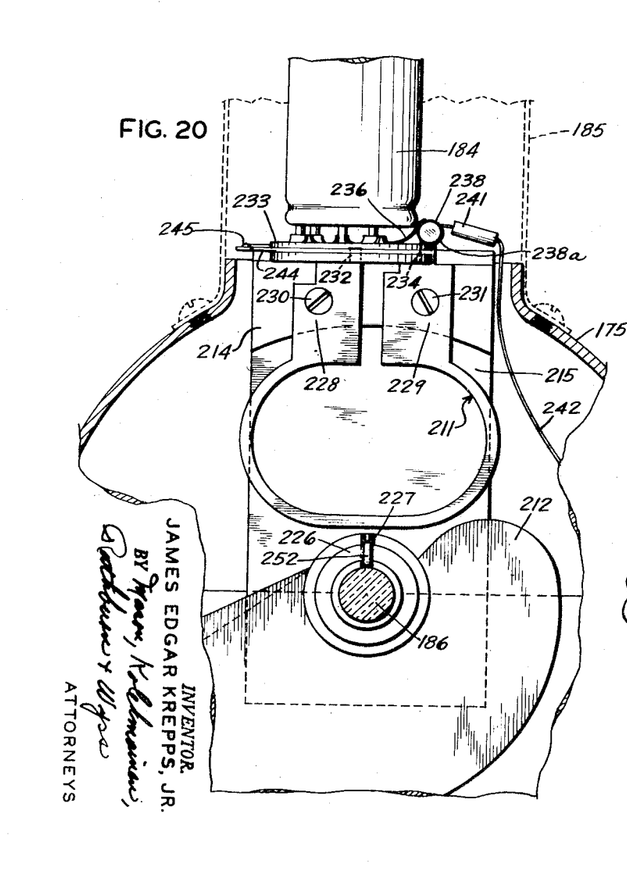
Fig. 20 is a cross sectional view on a somewhat larger scale taken along the lines 20—20 of Fig. 19.

As best illustrated in Fig. 20, the single turn inductance loop 211 is provided with relatively wide end portions 228 and 229 which are secured by means of the screws 230 and 231 to the supporting block 214. The end portion 228 of the loop 211 is provided with an upstanding prong portion 232 which is positioned within the central opening of a tube socket 233 and is soldered to the central eyelet of the tube socket 233 so as to support the tube socket thereon. The other end portion 229 of the loop 211 is also provided with an upstanding prong portion 234 which is positioned within a notch 235 (Fig. 18) in the tube socket 233 so as to prevent this socket from rotating and to provide a second supporting point therefor. The opposed grid terminals of the tube socket 233 are turned inwardly and connected to the center prong 232 of the loop 211 so that the grid terminals of the socket 233 are conductively connected to the end portion 228 of the loop 211. The anode terminals 236 and 237 of the tube socket 233 are respectively connected to opposite ends of a tubular ceramic condenser 238 having the annular conductive bands 238a and 238b around each end thereof and a central conductive band 239. The condenser 238 is threaded internally to receive the tuning screw 240 and as the screw 240 is introduced into the tubular element 238 a variable capacity between the annular conductive bands thereon is produced. The center band 239 of the condenser 238 is electrically connected as by soldering or the like to the prong 234 on the upper end of the end portion 229 of the loop 211. A resistor 241 is connected from the terminal 237 by way of the conductor 242 to an output terminal 243 in the casting 176. The terminals 244 and 245 of the tube socket 233 are connected together and through the coil 246 to the upper end of the supporting plate 215. The terminal 247 is connected through the condenser 248 to the supporting plate 215 and through the coil 249 to the output terminal 250 in the casting 176. A grid leak resistor 251 is connected at one end to the supporting plate 215 and at the other end to the end portion 228 of the inductance loop 211. A positive anode potential is applied to the input terminal 243 and a suitable filament potential is applied to the terminal 250 to energize the filament of the tube 184.

Figure 12:
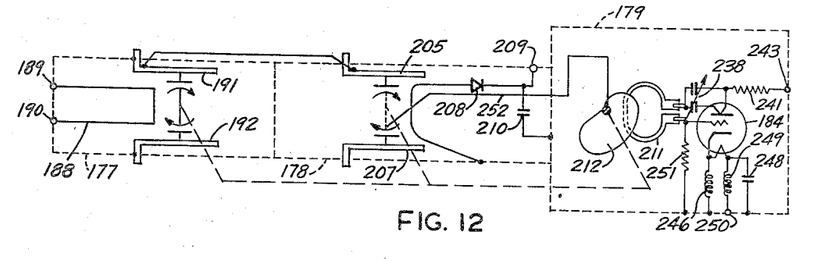
Fig. 12 is a schematic diagram of an alternative tuner arrangement embodying the present invention and shown in Fig. 15.
Figure 13:
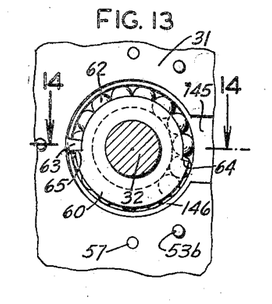
Fig. 13 is a detailed view taken along the line 13—13 of Fig. 5 and showing the manner in which the tuning shaft is mounted on the front end plate of the tuner.

Considering now the operation of the oscillator section of the tuner shown in Fig. 15, reference may be had to Fig. 12 wherein a schematic diagram of this tuner is shown. Referring to this figure, the oscillator circuit comprises the inductance loop 211 and the variable trimmer condenser 238 the two sections of which are connected between the control grid and the anode terminals of the tube 184. Oscillations are produced in the above-described tank circuit when the tube 184 is energized, as will be well understood by those skilled in the art, and as the tuning vanes 212 and 213 are rotated to cover a variable portion of the loop 211, the inductance thereof is changed so as to produce a corresponding change in the frequency of the oscillations produced in the oscillator tuning unit.

In order to couple voltage from the oscillator tuning unit to the mixer tuning unit there is provided the wire 252 which is connected from the hub 226 to the rotor hub 253 of the mixer tuning unit. With this arrangement the variable inductance tank circuit of the oscillator tuning unit may be conveniently coupled to the variable capacitance branch of the mixer tuning unit without the use of sliding contacts or the like.

While the condenser 238 acts as a trimmer capacitor to vary the resonant frequency of the tank circuit of the oscillator, the variation obtained thereby may not be sufficient to trim the oscillator tuning unit over the entire ultra-high-frequency band. Accordingly, provision is made for rotating the inductance loop 211 relative to the tuning vanes 212 and 213 without changing the adjustment of the trimmer condenser 238. Thus, the bearing sleeve 216 is provided with an aperture 254 therein (Fig. 16) which is accessible externally of the tuner and provides a means for rotating the bearing sleeve 216 relative to the tuning shaft 186. To perform this adjustment the screws 225 are loosened so as to loosen the supporting strap 224 and a sharp pointed instrument, such as a pick or the like, is inserted into the aperture 254 in the bearing sleeve 216 and the bearing sleeve is rotated a slight amount. Since the supporting plate 215 is carried on the inner end of the bearing sleeve 216 and the loop 211 is in turn supported from the supporting plate 215, rotation of the bearing sleeve 216 produces a variation in the relative position of the loop 211 and the short circuiting vanes 212 and 213. As a result, a linear adjustment of the local oscillator tuning is provided by the above-described adjustment of the bearing sleeve 216 after which the strap 224 is again tightened to clamp the bearing sleeve 216 in adjusted position.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed as new and desired to be secured by United States Letters Patent is:

1. In a tuner unit, a tuning shaft of insulating material, a cylindrical sleeve-like rotor hub of conductive material having a plurality of transverse grooves in the periphery thereof, a plurality of condenser rotor plates positioned in only a portion of the circumference of said grooves and carried by said rotor hub, said hub being split longitudinally thereof at a point intersecting said grooves which is removed from said plate retaining portions thereof, whereby said hub may be expanded while maintaining said rotor plates in fixed relation within said grooves, said hub in an unstressed condition having an inside diameter somewhat less than the diameter of said tuning shaft, whereby said hub may be forced onto said shaft and positioned as desired along the length thereof in securely held relation thereto.

2. A tuner unit comprising a chassis member having a deck portion and opposed end portions, a plurality of shield partitions positioned parallel to said end portions and spaced intermediate said end portions to form with said chassis member a plurality of tuning compartments, a tuning shaft extending transversely of said partitions through said compartments and supported at either end by said end portions, a tie-bar connecting one edge of said partitions and said end portions and positioned between said deck portion and said tuning shaft, insulating support means for supporting a plurality of stator condenser plates on said tie-bar in one of said compartments, an oscillator tube carried by said deck portion, a transmission line section connected at an end to said stator plates and connected at the other end to input and output electrodes of said tube, a first rotor hub carried by said shaft and carrying a plurality of rotor condenser plates which cooperate with said stator plates to form a variable capacitor, said transmission line section having an electrical length of approximately three-quarters of a wavelength when loaded by said variable capacitor, a tuned circuit in another of said compartments and including a conductive inductance member supported at one end on said deck portion within said other compartment and carrying on the free end thereof a plurality of stator condenser plates, a second rotor hub carried by said shaft and carrying a plurality of rotor condenser plates which cooperate with said stator plates in said other compartment to form a second variable capacitor effective to vary the tuning of said tuned circuit upon rotation of said tuning shaft, and means connecting said inductance member to said tie-bar intermediate said deck portion and the free ends thereof to prevent tuned circuit currents from flowing through said deck portion.

3. In a tuner unit, the combination of a shielded compartment, a conductive member supported at one of its ends on an end wall of said compartment and having a slot in the opposite one of its ends defining a pair of arms displaced from said end wall by a substantial distance, a tuning shaft extending through said compartment in proximity to said arms, a set of stator plates mounted on each of said arms near the ends thereof, a set of rotor plates mounted on said shaft for cooperating with said stator plates to provide a split-stator variable capacitor, a conductive side wall of said compartment disposed in close proximity to said conductive member, and a conducting strap directly connected between said side wall and a point on said conductive member closely adjacent the bottom of said slot and disposed at a substantial distance from said end wall, thereby to prevent the flow of undesired currents in said end wall.

References Cited in the file of this patent

UNITED STATES PATENTS

| | | |
|---|---|---|
| 1,525,778 | Hellmann | Feb. 10, 1925 |
| 1,573,374 | Chamberlain | Feb. 16, 1926 |
| 2,272,062 | George | Feb. 3, 1942 |
| 2,277,638 | George | Mar. 24, 1942 |
| 2,341,345 | Van Billiard | Feb. 8, 1944 |
| 2,382,693 | Dallenbach | Aug. 14, 1945 |
| 2,471,155 | Langmuir | May 24, 1949 |
| 2,491,480 | Davis et al. | Dec. 20, 1949 |
| 2,514,957 | Larson | July 11, 1950 |
| 2,516,981 | Hall | Aug. 1, 1950 |
| 2,521,963 | Beusman | Sept. 12, 1950 |
| 2,542,416 | Kack | Feb. 20, 1951 |
| 2,585,844 | Romero | Feb. 12, 1952 |
| 2,587,667 | Toth | Mar. 4, 1952 |
| 2,769,961 | Chesney | Nov. 6, 1956 |

FOREIGN PATENTS

| | | |
|---|---|---|
| 339,053 | Italy | Apr. 14, 1936 |
| 872,172 | France | June 1, 1942 |